March 20, 1934.    W. M. TRAFTON    1,951,495
LIGHT CONTROL SYSTEM
Filed June 30, 1932

William M. Trafton
INVENTOR
By Harry Dexter Peck
ATTORNEY

Patented Mar. 20, 1934

1,951,495

UNITED STATES PATENT OFFICE 1,951,495

LIGHT CONTROL SYSTEM

William M. Trafton, Providence, R. I.; The National Bank of Commerce and Trust Company, Providence, R. I., executor of said William M. Trafton, deceased Application June 30, 1932, Serial No. 620,166

2 Claims. (Cl. 171—97)

This invention relates to improvements in light control systems. More especially it is directed to an improved system for automatically controlling the lighting system of a vehicle. The invention is particularly disclosed in its application to an automobile, but this is to be taken as merely illustrative since the principles of the invention may be applied in the lighting system of any vehicle.

A major object of the invention is to provide a system whereby when a vehicle is in motion, or its driving motor is in operation, one set or kind of lights will be shown and when the vehicle or its motor stops another set or kind of lights will be automatically turned on as the first mentioned lights are turned off, and further, upon the vehicle or motor again being set in motion the second kind of lights are shut off and first mentioned lights again turned on. More specifically, in the case of an automobile, it is an object to provide a control system which is actuated by the movement of the vehicle or operation of its motor to keep the head-lights on and to shut these lights off and put on the parking lights when the vehicle or motor stops, and then put off the parking lights and again light the headlights when the vehicle or motor resumes motion. It is of course a further object to provide such a system that, if desired, any particular set of lights may be kept on or off indefinitely and to allow the operator to select the automatic control at his pleasure.

It is intended that the patent shall cover by suitable expression in the appended claims whatever features of patentable novelty exist in the invention disclosed.

In the drawing, which is largely diagrammatic,

Figure 1:
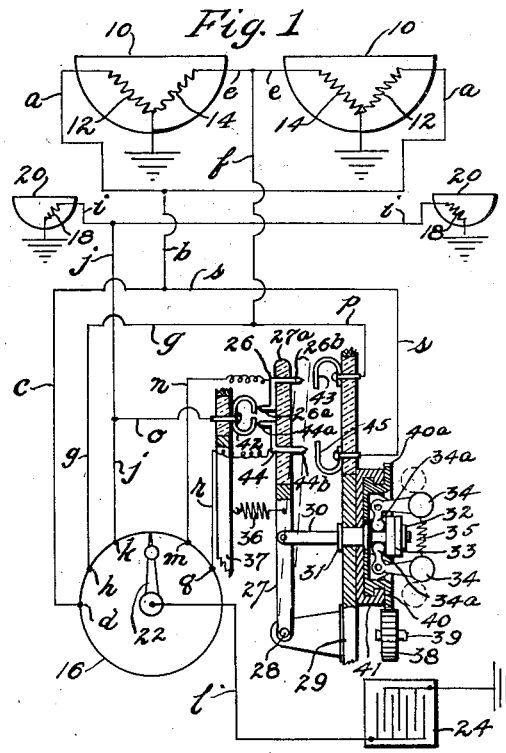
Figure 1 shows a control system embodying the present invention.

Referring more particularly to the drawing, the head lights 10 are illustrated as being provided with the double filament bulbs, one set 12 being arranged to effect a more distant projection of the light rays than does the other set of filaments 14. The set 12 is connected to the switch plate 16 by the wires *a*, *b*, and *c*, the latter being connected to the terminal *d*. The other set of filaments 14 is similarly connected by the wires *e*, *f*, and *g* to the terminal *h*. In like manner the filaments 18 of the side lamps or parking lights 20 are connected by wires *i* and *j* to the terminal *k* of the switch plate. The switch arm 22 of the latter is connected by wire *l* to the storage battery 24. If no lights are to be turned on, the switch arm 22 is left in the position where it is shown in Figure 1, but if the operator desires to light any of the three sets of filaments and keep them lighted regardless of whether the vehicle or motor is in motion or not, he turns the switch arm 22 to either terminal *d*, *h* or *k*. When so turned the filaments thus lighted will continue to be lighted until the operator again changes the setting of this switch arm. Thus far the control is such as is customarily provided on most automobiles today.

It frequently happens, however, that the driver parks his car with the headlamps lighted forgetting to throw the hand switch to the parking light position and occasionally, after having had the parking lights on, he drives the vehicle without remembering to turn on the headlights. It is a principal object of this invention to avoid such conditions. This is accomplished by providing additional terminals on the switch plate and additional conduits between them and the filaments and an automatic switching device which operates in accordance with the movement of the vehicle or the operation of the motor.

In Figure 1 is shown an embodiment of the invention wherein the automatic control is in accordance with the movement of the vehicle. There is on the switch plate 16 a terminal *m* which is connected by wire *n* with a contact member 26 having contact points 26*a* and 26*b*. This member 26 is carried by the insulated portion 27*a* of a lever 27 fulcrumed at 28 to a fixed support 29. A rod 30 extends from this lever through a bearing 31 and has on its end a collar 32 and next to this a thrust bearing 33. The short arms 34*a* of a pair of weighted bell cranks 34 are arranged to act on the thrust bearing and move the rod 30 and lever 27 to the right whenever the bell cranks are rotated at sufficient speed to overcome the tension of a spring 35 interposed between them and another spring 36 between the lever 27 and a fixed support 37. Rotation of the bell cranks is affected by a suitable connection, represented by the gear 38 and shaft 39, with the drive shaft of the vehicle or other moving part whose motion corresponds with that of the vehicle. The gear 38 meshes with the toothed rim 40a of the rotatable member 40 which is suitably mounted in its supporting base 41 and carries the centrifugal responsive bell cranks.

Assuming the vehicle to be at rest and that the operator wishes to light the parking lights, he moves switch arm 22 so that its point engages terminal m. The current from the battery 24 will then flow along wire l, arm 22 and wire n to the contact member 26. With the vehicle at rest its point 26a will be incontact with a spring contact member 42 secured to the fixed support 37. This member 42 is connected by wire o with the wire j leading via wires i to the filaments 18 of the parking lamps. Accordingly these lamps will be lighted and continue to be lighted so long as the vehicle is at rest.

Figure 2:
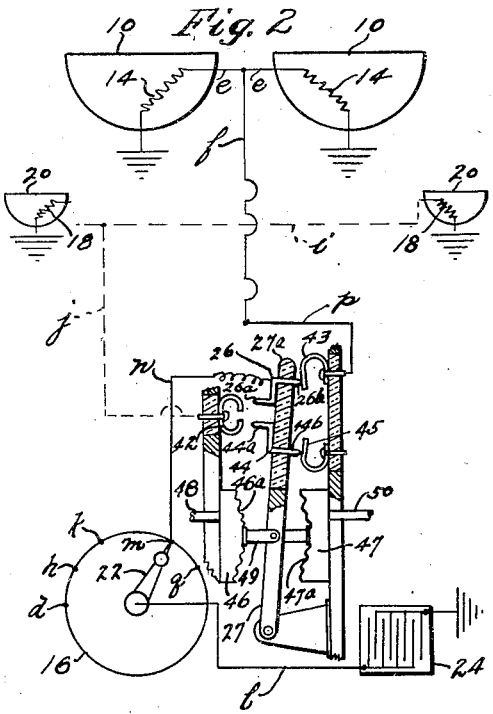
Figure 2 shows portions of this system (with modified actuating means) when one set of the head-light filaments are lighted.

Upon starting the vehicle in motion, the rotatable member 40 begins to turn, carrying with it the weighted bell cranks 34 and as their speed increases the weighted arms promptly tend to move outward toward the dotted positions shown and, as before stated, when their tendency to move overcomes the forces of springs 35 and 36 the arms fly outward to said dotted positions. This effects the swinging of lever 27 to the dotted position shown in Figure 1, which position is shown in full lines in Figures 2 and 3. As the lever swings, the contact point 26a of member 26 leaves the spring contact member 42 and its other point 26b engages another spring contact member 43. The latter is connected by wire p with wire f leading to the set of filaments 14 in the head lamps. Accordingly, the closed circuit will now be as seen in Figure 2, with the current flowing from battery 24 through wire l, switch arm 22, wire n, spring contact member 26, spring contact member 43 and wires p, f and e to the filaments 14. Thus due to motion of the vehicle the headlamps are automatically lighted and the parking lights put out.

When the vehicle comes to rest, the bell cranks are retracted and lever 29 swings back to its full line position seen in Figure 1, whereupon the head lamps are extinguished and the parking lights relighted.

In like manner the filaments 12 can be automatically lighted due to the movement of the vehicle if the operator turns the switch arm 22 to a terminal q on the switch plate 16. This terminal is connected to another contact member 44 whose points 44a and 44b are adapted to make contact respectively with the spring contact member 42 and another spring contact member 45. The latter is connected by wire s with wire b leading to filaments 12 of the headlamps. When the vehicle is in motion and the lever thrown to its dotted position in Figure 1, which is its full-line position seen in Figure 3, the circuit is from battery 24, through wire l, switch arm 22, wire r, contact member 44, spring contact 45, and wires s, b and a to the terminals 12. When the vehicle comes to rest, and the lever returns to its full-line position of Figure 1, the circuit will be established from the battery 24, through wire 1, arm 22, wire r, contact member 44, spring contact 42, and wires o, j and i to the parking light filaments 18.

Thus the operator by selecting the position of the switch arm 22 can provide for the automatic lighting of either set of headlamp filaments when the vehicle starts to move and the automatic shutting off of the headlamps and the lighting of the parking lights when the vehicle is brought to rest.

If preferred, the automatic control of the lever 27 can be effected in other ways. For example, in Figure 2 there is shown two pressure chambers 46 and 47. The former may be connected by pipe 48 to a pressure generating device which upon the starting of the motor of the vehicle, or the vehicle itself, will cause sufficient pressure to be built up in chamber 46 to cause its diaphragm wall 46a to be flexed, and by virtue of its connection 49 with the lever 27 cause the latter to swing as already described. Or, the chamber 47 may be connected by pipe 50 to the intake manifold of the engine or to any suitable suction means, so that upon the vehicle or motor being started a vacuum will be formed in chamber 47 thereby causing its diaphragm wall 47a to flex and by virtue of the connection 51 thus swing the lever.

Figure 3:
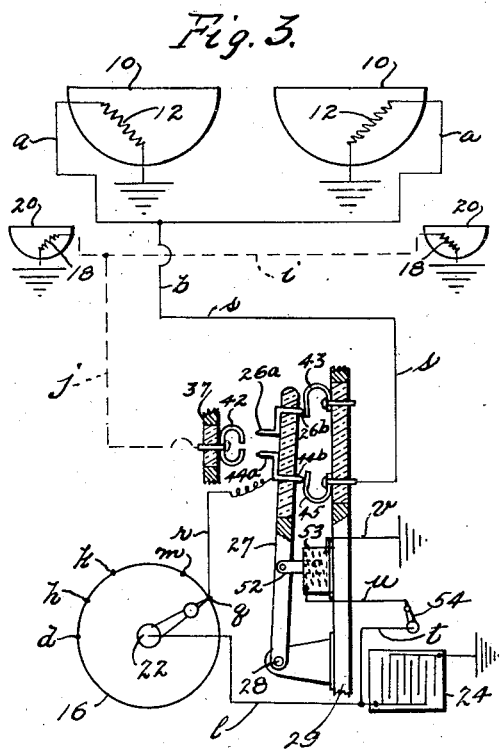
Figure 3 shows other portions of this system (with other actuating means) when another set of head-light filaments are lighted.

In Figure 3 another means is shown for swinging the lever. In this arrangement the lever 27 is connected to a rod 52 which forms the movable armature of an electromagnet 53. This magnet is connected to the ignition switch 54 and also grounded as shown. Accordingly when the ignition is turned on, as shown in Figure 3, the current flow from battery 24 through wire t, the switch 54, wire u, the magnet 53, and wire v will energize the magnet, and cause its armature to be pulled in, thereby swinging the rod to the position shown in Figure 3.

Figure 4:
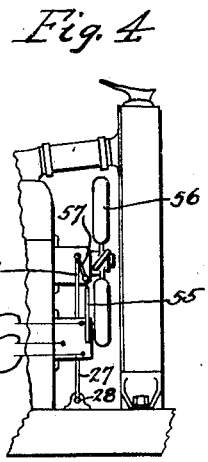
Figure 4 shows a further modification of the means which actuates the automatic control mechanism.

In Figure 4 still another means is disclosed for actuating the lever. A vane 55 is pivotally mounted on the motor back of the fan 56 in position to be swung by the air currents driven by the latter. A short crank 57 associated with the vane is connected to the end of lever 27 and as the vane swings toward the left, as seen in Figure 4, the lever is swung toward the right into the position seen in Figures 2 and 3. Upon stoppage of the motor and fan, the vane swings downward and the lever is shifted as heretofore described.

Although particularly herein shown and described in its application to an automobile lighting system, the invention is not so limited but is to be understood as applicable to any vehicle or indeed to any system where different lights are to be shown in predetermined relation to the operation of a moving element. I have not shown the additional circuits which may be provided for effecting the simultaneous lighting of a tail lamp whenever either the headlamps or parking lamps are lighted, because such additional circuits are well known and in common use and may be added to the improved system herein disclosed without the exercise of any inventive skill.

I claim:

1. A light control system for a vehicle comprising, in combination, a source of electrical energy; two lightable filaments; two separate circuits from said source to each of said filaments; a manually operated switch capable of being set selectively to establish one of said circuits; two of said circuits being arranged when thus established to continue the flow of electrical energy to the selected filament, and the other two of said circuits having an automatic switch associated therewith arranged and constructed so that when in one position one of the last two said circuits is closed and the other is open, and when in another position the condition of the last two said circuits is reversed; and means actuated in accordance with the movement of the vehicle for moving said automatic switch to one position when the vehicle is in motion and to the other position when motion of the vehicle ceases.

2. A system for controlling the lights of a vehicle comprising, in combination, a source of electrical energy; a head light; a parking light; two separate circuits from said source to each of said lights; a manually actuated switch adapted to be set selectively to establish one of said circuits; one pair of said circuits when closed being capable of continuing the flow of electrical energy to the selected light and the other pair of said circuits comprising an automatic switch arranged and constructed to effect, when in one position, the closure of the circuit to the head light and the opening of the circuit to the parking light and, when in another position, to effect the opening of the circuit to the head light and the closure of the circuit to the parking light; and means actuated in accordance with the movement of said vehicle to move said automatic switch to effect lighting of the head light and extinguishing of the parking light when the vehicle is in motion and to effect lighting of the parking light and extinguishing of the head light when motion of the vehicle ceases.

WILLIAM M. TRAFTON.